June 9, 1959 J. W. LATHROP ET AL 2,890,395

SEMICONDUCTOR CONSTRUCTION

Filed Oct. 31, 1957 6 Sheets-Sheet 1

INVENTORS
JAY W. LATHROP
JAMES R. NALL

BY W. E. Thibodeau, T. J. Lynch, J. E. McGee & J. P. Edgerton

INVENTORS
JAY W. LATHROP
JAMES R. NALL
BY W. E. Thibodeau, T. J. Lynch,
F. E. McGee & J. P. Edgerton INVENTORS
JAY W. LATHROP
JAMES R. NALL
BY W. E. Thibodeau, T. J. Lynch,
J. E. McGee & J. P. Edgerton INVENTORS
JAY W. LATHROP
JAMES R. NALL
BY W. E. Thibodeau, T. J. Lynch,
J. E. McGee & J. P. Edgerton INVENTORS
JAY W. LATHROP
JAMES R. NALL
BY W. E. Thibodeau, T. J. Lynch,
A. E. McGee & J. P. Edgerton June 9, 1959

J. W. LATHROP ET AL 2,890,395

SEMICONDUCTOR CONSTRUCTION

Filed Oct. 31, 1957

6 Sheets-Sheet 6

INVENTORS
JAY W. LATHROP
JAMES R. NALL
BY W. E. Thibodeau, T. J. Lynch,
F. E. McGee & J. P. Edgerton

United States Patent Office 2,890,395

Patented June 9, 1959

2,890,395

SEMICONDUCTOR CONSTRUCTION

Jay W. Lathrop and James R. Nall, Silver Spring, Md., assignors to the United States of America as represented by the Secretary of the Army Application October 31, 1957, Serial No. 693,788

3 Claims. (Cl. 317—234)

(Granted under Title 35, U.S. Code (1952), sec. 266)

The invention described herein may be manufactured and used by or for the Government for governmental purposes without the payment to us of any royalty thereon.

This invention relates to a novel semiconductor construction, especially as applied to transistors.

It is the object of this invention to provide a semiconductor construction which permits of very great miniaturization and provides a high resistance to very large shocks and vibrations.

It is a further object of this invention to provide a semiconductor construction which is integrally incorporated with a printed circuit plate.

A typical form of the invention essentially comprises a transistor unit mounted in a printed circuit plate with its junction contacts electrically connected to appropriate printed circuit leads by means of metal deposited therebetween. This construction eliminates the need for the spring loaded or pressure bonded leads utilized in the prior art thus providing the important advantages of permitting a very considerable reduction in size, and greatly increasing the resistance of the unit to shock and vibration. It should be noted that although some of the techniques utilized in producing the novel semiconductor construction of this invention are similar to the techniques employed in printed circuitry, there has been no previous attempt in the prior art to incorporate these techniques with semiconductor construction so as to provide the very important advantages achieved by this invention.

The specific nature of the invention, as well as other objects, uses, and advantages thereof, will clearly appear from the following description and from the accompanying drawing, in which:

Figures 2A, 2B through 8A, 8B represent plan and cross-sectional views, respectively, of various stages in the construction of the device of Figures 1A and 1B.

Like numerals designate like elements throughout the figures of the drawing.

Figure 1A:
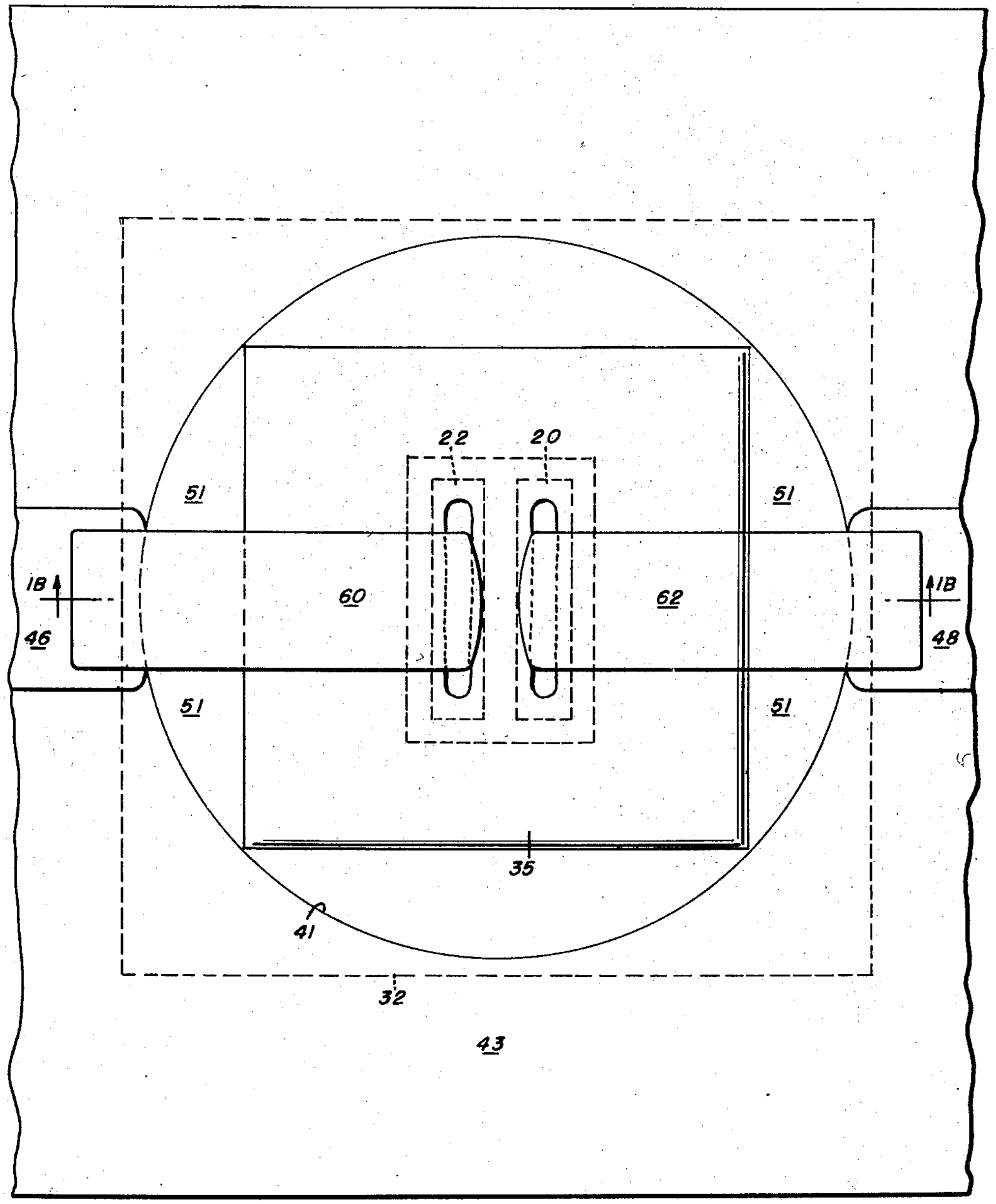
Figure 1A is a plan view of a transistor unit integrally mounted with a printed circuit plate in accordance with the invention.
Figure 1B:
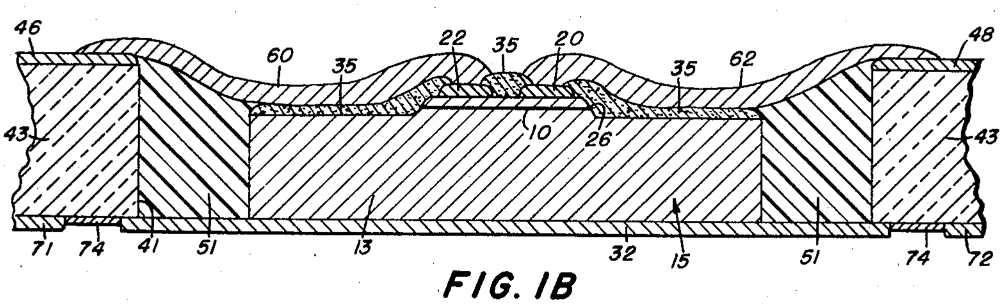
Figure 1B is a cross-sectional view taken along 1B—1B in Figure 1.

In Figures 1A and 1B, a transistor unit is shown integrally incorporated with a printed circuit plate. The device shown in Figures 1A and 1B will be described by a detailed description of a preferred method for providing this novel construction. Figures 2A, 2B through 8A, 8B which show the device of Figures 1A and 1B in various stages of construction will be used in connection with this detailed description.

Figure 2A:
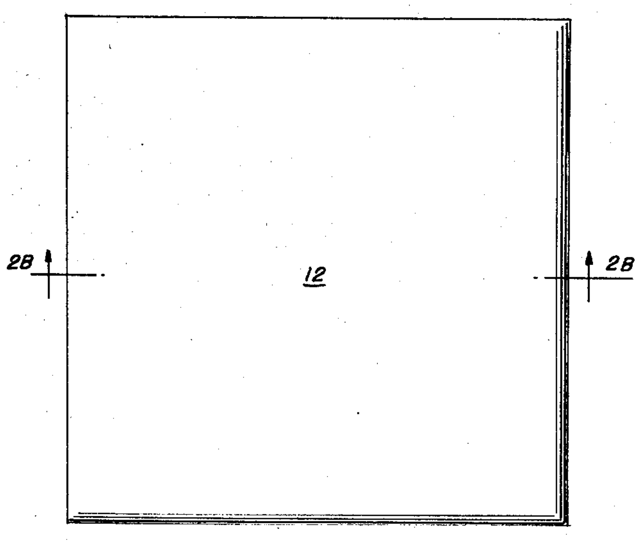
Figure 2B:
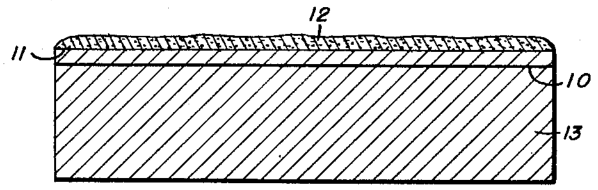
Figure 4A:
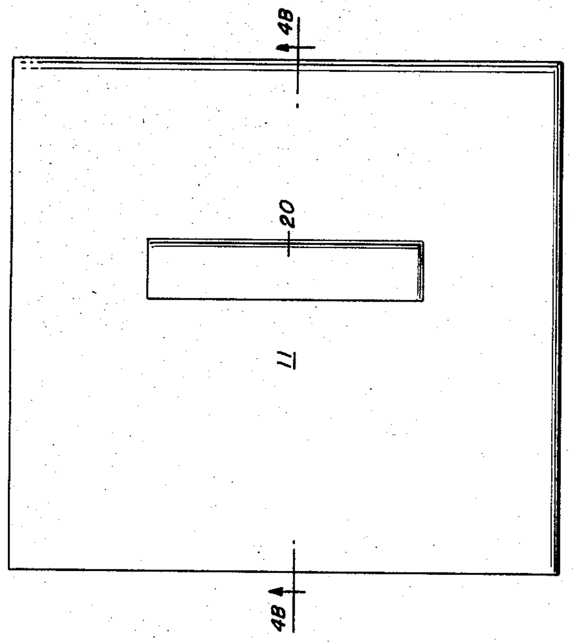
Figure 4B:
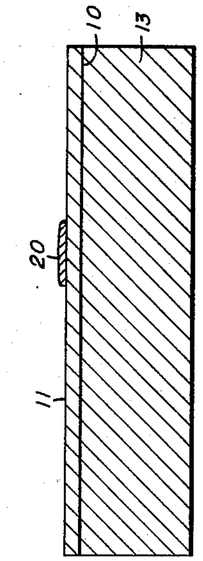
Figure 3A:
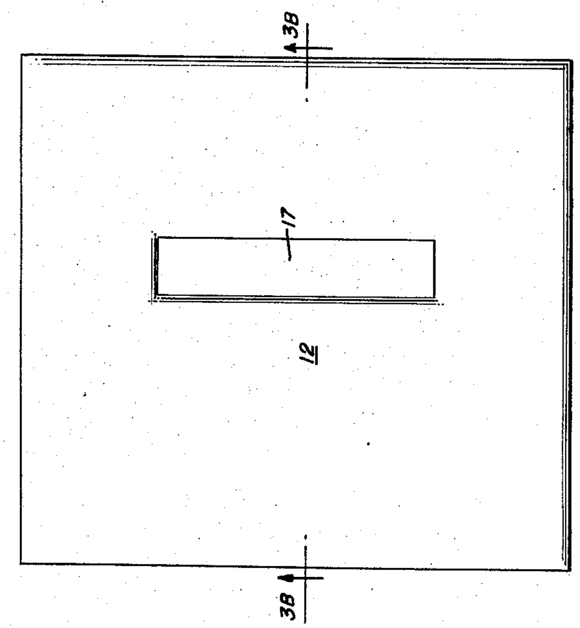
Figure 3B:
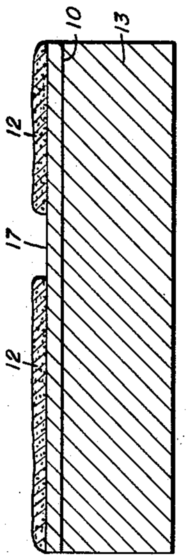

The preferred method to be described involves the construction of a diffused base p-n-p germanium transistor integrally incorporated in a printed circuit plate in accordance with the invention. Starting with a germanium wafer 13 having a p-n junction 10, a layer of photosensitive resist 12 is laid down over the surface 11 as shown in Figures 2A and 2B. The resultant surface is then exposed to ultra violet light and developed in such a way as to leave a rectangular shaped area 17 where no resist covers the germanium surface 11 as shown in Figures 3A and 3B. A metal such as aluminum is then evaporated over the entire resultant surface. The underlying resist 12 is then chemically stripped away so that only a rectangular bar of aluminum 20 remains where it was vacuum deposited directly on the germanium surface 11 as shown in Figures 4A and 4B. Subsequent alloying of the aluminum bar 20 into the germanium surface 11 using conventional techniques gives rise to a p-type regrowth region which serves as an emitter contact.

Figure 5A:
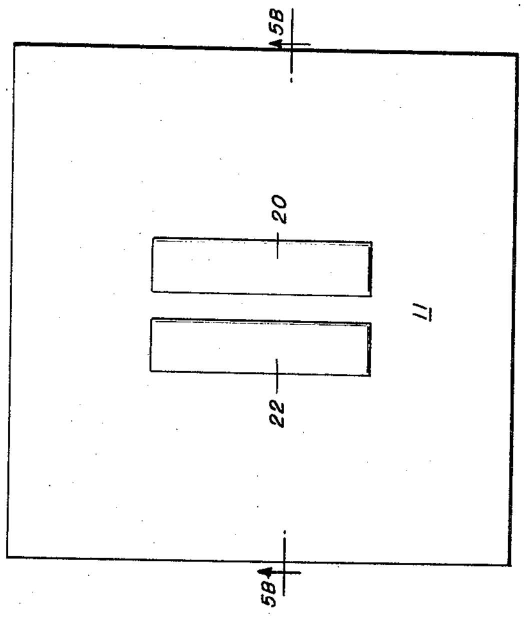
Figure 5B:
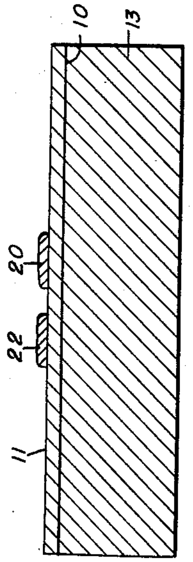

A similar technique may be used to place a second rectangular bar 22 on the germanium surface 11 parallel to, but displaced from the first bar 20 as shown in Figures 5A and 5B. Gold with a small percentage of antimony is preferably used as the metal for the second bar 22. The gold may be deposited using plating techniques in which an electrical connection is made to the germanium 13. Plating will occur only where there is no resist. Subsequent alloying of the gold bar 22 into the germanium surface 11 produces an ohmic region which serves as the base contact.

Figure 6A:
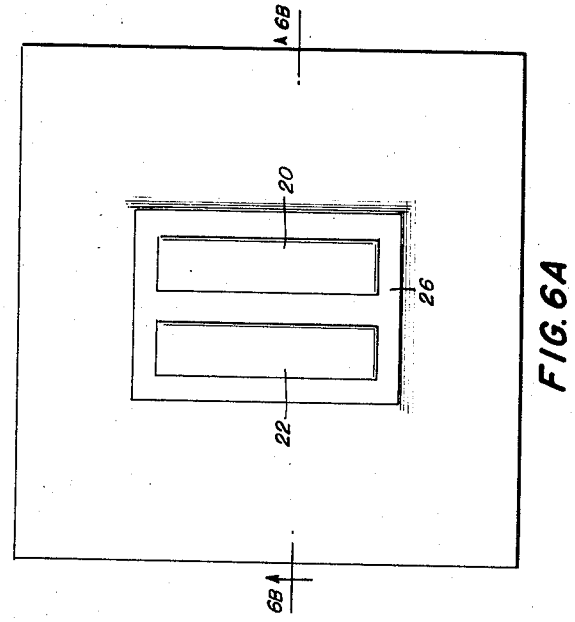
Figure 6B:
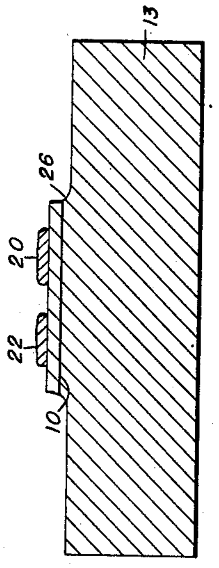

The collector-base junction is now defined by coating the surface around the parallel bars 20 and 22 with photosensitive lacquer and etching away the unwanted material. The result is shown in Figures 6A and 6B. The lacquer is chosen to be such that it is not attacked by the normal etches used for germanium. The pedestal 26 so formed need only be high enough to expose the junction, or about 0.0005". A metal plate 32 is soldered to the bottom of the germanium 13 and serves as the collector contact. The base, emitter and collector terminals of the constructed transistor are now accessible as ohmic contacts.

Figure 7A:
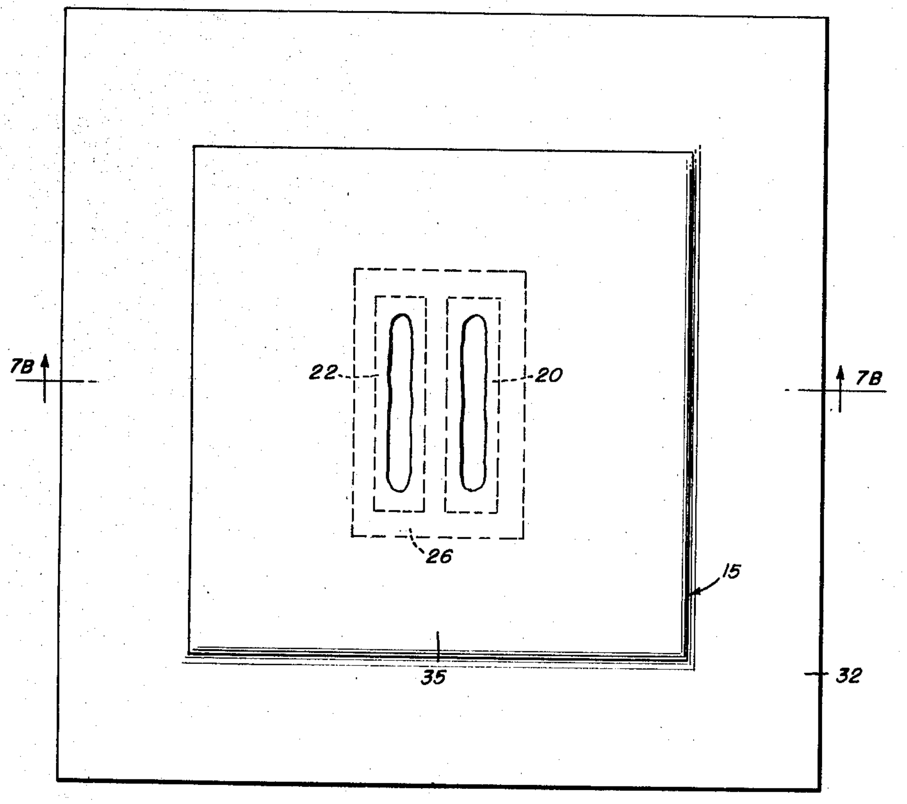
Figures 7A and 7B show the completed transistor unit before mounting in a printed circuit plate.
Figure 7B:
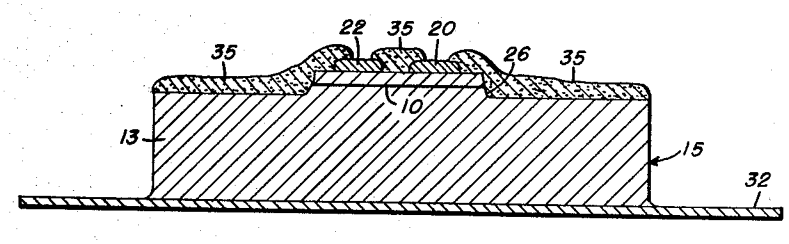

As shown in Figures 7A and 7B, another layer of resist 35 is now laid down, and then exposed and developed so as to leave sections of the gold and aluminum bars 22 and 20 uncovered by the resist 35. The resist 35 serves as a protecting film over the surrounding areas of the transistor so that any degradation of transistor characteristics will be prevented.

Figure 8A:
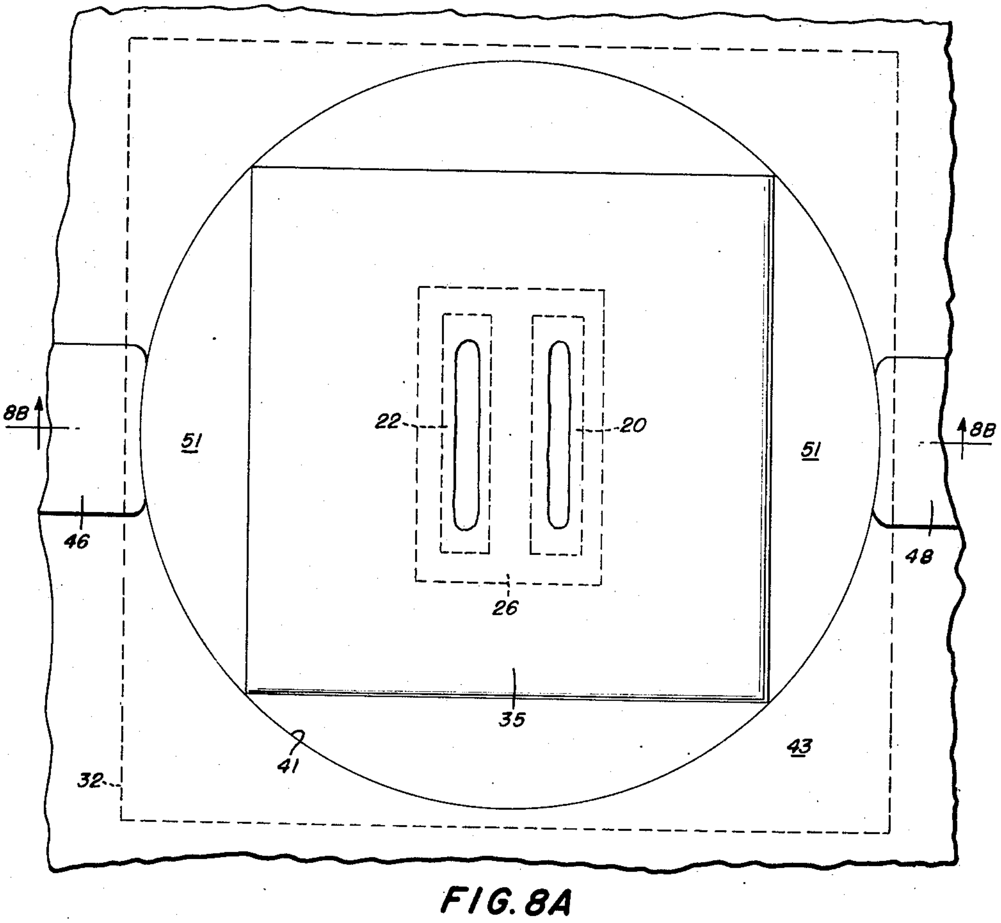
Figure 8B:
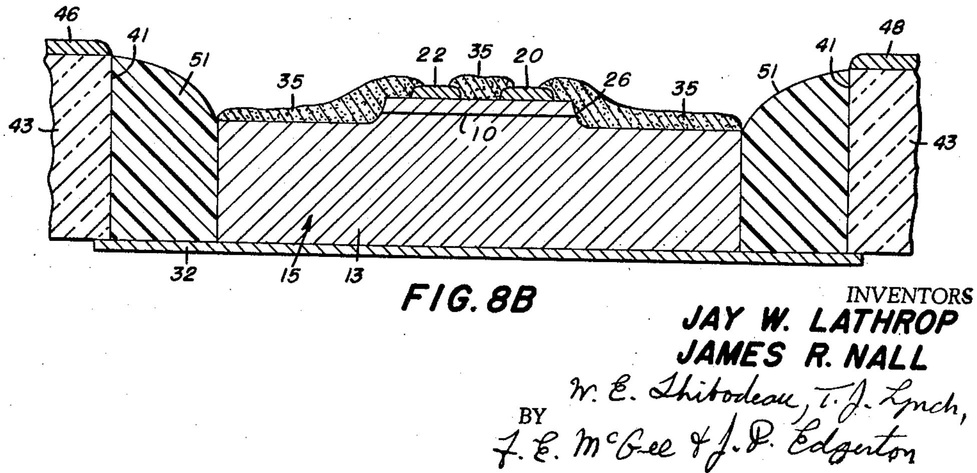

The unit 15 with the protective resist coating 35 may now be integrally incorporated with a conventional printed circuit plate 43 on which leads 46 and 48 have been fired. As shown in Figures 8A and 8B, an oversized hole 41 is provided in the printed circuit plate 43 to receive the transistor unit 15. A plastic insulating material 51 is then filled in between the transistor unit 15 and the printed circuit plate 43 and serves to hold the unit 15 in place. Aluminum or other suitable metal is now evaporated onto the entire assembly with rough masking employed to limit the deposition to the desired areas. The completed device is shown in Figures 1A and 1B with the numerals 60 and 62 representing the regions of aluminum deposited so that the emitter contact 20 and the base contact 22 are electrically connected to printed circuit leads 48 and 46, respectively. Electrical connection to the metal plate 32 serving as the collector contact may be provided by any suitable means. In Figures 1A and 1B the metal plate 32 is connected to printed circuit leads 71 and 72 by layers of conductive paint 74. The entire device may be potted in a suitable epoxy if so desired.

The above description has illustrated an example of a structure and method in accordance with the invention. Although a transistor has been used in the embodiment shown, it is obvious that a similar method and construction can also be applied to any other type of semiconductor. It is also obvious that the semiconductor may be electrically connected in any other suitable lead arrangement in addition to the printed circuit leads described in this embodiment.

To give some idea of the considerable miniaturization made possible by the invention, a transistor unit constructed in accordance with the drawing and the preferred method had a maximum diameter of less than one-tenth of an inch. This means that with a construction in accordance with the invention, a transistor unit can be mounted in a printed circuit plate area of less than one-tenth inch. Furthermore, with the embodiment of Figures 1A and 1B potted in a suitable epoxy, tremendously large shocks and vibrations were applied with no apparent deleterious effect either on mechanical structure or electrical performance.

It will be apparent that the embodiments shown are only exemplary and that various modifications can be made in construction and arrangement within the scope of the invention as defined in the appended claims.

We claim as our invention:

1. In combination: a semiconductor having a body and at least one contact formed therein, a layer of photosensitive resist between said body and said contact; a printed circuit plate having at least one printed lead, said plate having an oversized opening in which said semiconductor is placed; an insulating material in said opening between the body of said semiconductor and said plate; and a metal layer deposited on the surfaces of said insulating material and said resist electrically connecting said contact and said lead.

2. In combination: a semiconductor having a body, first and second adjacent contacts formed on the upper surface of said body, a layer of photosensitive resist over the upper surface of said body with portions of said first and second contacts left uncovered; a printed circuit plate having an oversized opening into which the body of said transistor is placed, said plate having first and second leads printed on its upper surface; an insulating material in said opening between said body and said plate and serving to hold said body in place; a first metal layer deposited on the surfaces of said insulating material and said resist between said first lead and the uncovered portion of said first contact; and a second metal layer deosited on the surfaces of said insulating material and said resist between said second lead and the uncovered portion of said second contact, said first and second metal layers being unconnected.

3. A method for integrally incorporating a semiconductor having a body and two adjacent contacts formed on a surface thereof, with a printed circuit plate having printed leads thereon to be connected to said contacts, said method comprising the steps of: laying down a layer of photosensitive resist over the surface of said body in which said contacts are formed so that portions of said first and second contacts remain uncovered, cutting an oversized opening in said printed circuit plate to receive the body of said semiconductor, filling in the space between said body and said plate with an insulating material, and depositing unconnected metal layers on the surfaces of said insulating material between the uncovered portions of each of said two adjacent contacts and one of said printed leads so as to form an electrical connection therebetween.

References Cited in the file of this patent

UNITED STATES PATENTS 2,680,220 Starr et al. ............... June 1, 1954